April 27, 1965 E. I. COULON ETAL 3,180,196
APPARATUS FOR SHEARING THE ENDS OF A TUBULAR MEMBER
Filed June 25, 1963 2 Sheets-Sheet 1
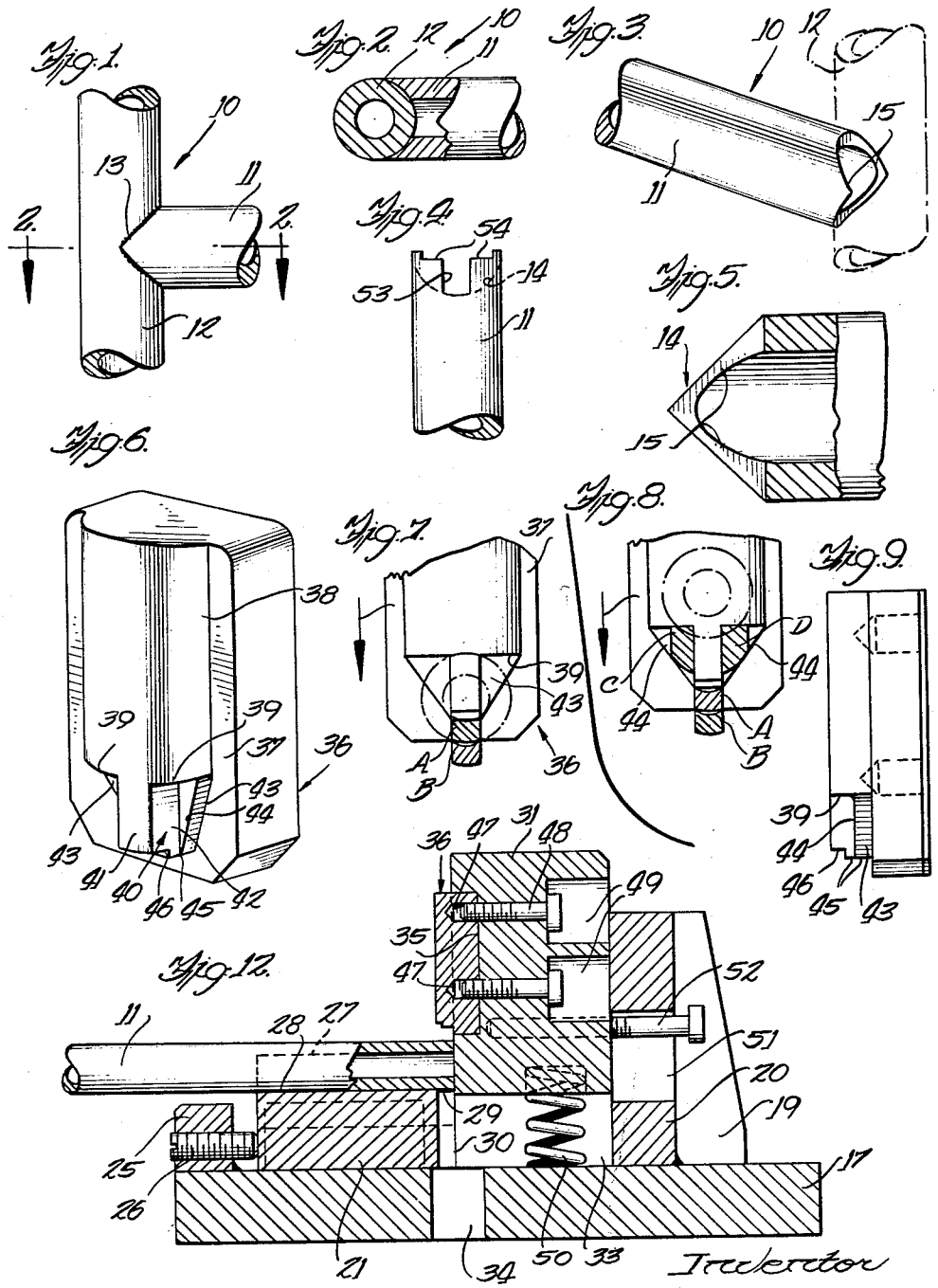

April 27, 1965  E. I. COULON ETAL  3,180,196
APPARATUS FOR SHEARING THE ENDS OF A TUBULAR MEMBER
Filed June 25, 1963  2 Sheets-Sheet 2

United States Patent Office 3,180,196
Patented Apr. 27, 1965

3,180,196
APPARATUS FOR SHEARING THE ENDS OF A TUBULAR MEMBER
Edward I. Coulon, Chicago, and Harry J. May, Lombard, Ill., assignors to Vogel Tool & Die Corporation, Melrose Park, Ill., a corporation of Illinois
Filed June 25, 1963, Ser. No. 290,508
4 Claims. (Cl. 83—581)

This invention relates to apparatus for preparing the ends of a tube. More specifically it relates to apparatus for notching the ends of a tube so that the tube will conform to the contour of another tube to which it is connected in angularly disposed relation.

The Frank Koster Patents 3,005,369 issued October 4, 1961 and 3,073,195 dated January 15, 1963 discloses respectively a method and apparatus for notching the ends of tubing in the preparation of tubular assemblies. In the construction shown in these patents the tube is placed in a first stage punch and die assembly wherein an elongated narrow slot is initially formed in the end of the tube. The notched end of the tube is then placed in a second stage punch and die assembly whereupon the narrow slot in the end of the tube is enlarged and the forming of the tube is thus completed.

It is a prime object of this invention to provide improved apparatus wherein the complete forming of the tube end may be accomplished in a single stage punch and die assembly during one stroke of a press.

It is another object of the invention to provide improved apparatus wherein the punch and die utilized in the formation of the tube end is particularly adapted for preparing tubes having a relatively thick or heavy gauge wall.

A still further object of the invention is to provide an improved apparatus wherein a tube end may be prepared in a single stroke of a punch and die assembly, the said tube end being provided with a relatively sharp wall at its notched or shaped end so that a snug fit may be obtained in assembling the tube and to the outer contour of another tube and whereby the brazing and welding of the said assembly is greatly facilitated.

A still further object of the invention is to provide an improved single stroke forming operation and apparatus for preparing a tube end, the said apparatus including a plurality of spaced cutting edges which will successively and simultaneously during the single stroke of the apparatus initially provide a narrow slot in the upper end of the tube, shear a portion of the upper edge of the tube to the outer edge of the tube, then shear a notch in the lower end of the tube and finish the forming of the tube by shearing through the lower wall again to the outer edge of said tube.

These and other objects will become more readily apparent from a reading of the description when examined in connection with the accompanying sheets of drawings.

In the drawings:

FIGURE 1 is a detail side elevational view of a pair of tubes connected together in T-shaped formation;

FIGURE 2 is a cross sectional view taken along the line 2—2 of FIGURE 1;

FIGURE 3 is another detail view similar to FIGURE 1 showing a pair of tubes adapted to be connected in assembled relation with one of the tubes disposed at an angle less than a right angle with respect to the other tube;

FIGURE 4 is a detail view of an end of a tubular member showing a stage in its forming operation;

FIGURE 5 is a cross sectional view through an end of a formed tubular member showing sheared edges thereof;

FIGURE 6 is a perspective view of a punch having a plurality of cutting edges;

FIGURE 7 is a schematic view showing a punch and its cutting edges in operation through the wall of a tube;

FIGURE 8 is a view similar to FIGURE 7 showing a punch as it completes a forming operation on a tube end;

FIGURE 9 is a side elevational view of the punch shown in FIGURE 6;

FIGURE 12 is a cross sectional view through the apparatus shown in FIGURE 11 and taken along the section line 12—12.

Figure 10:
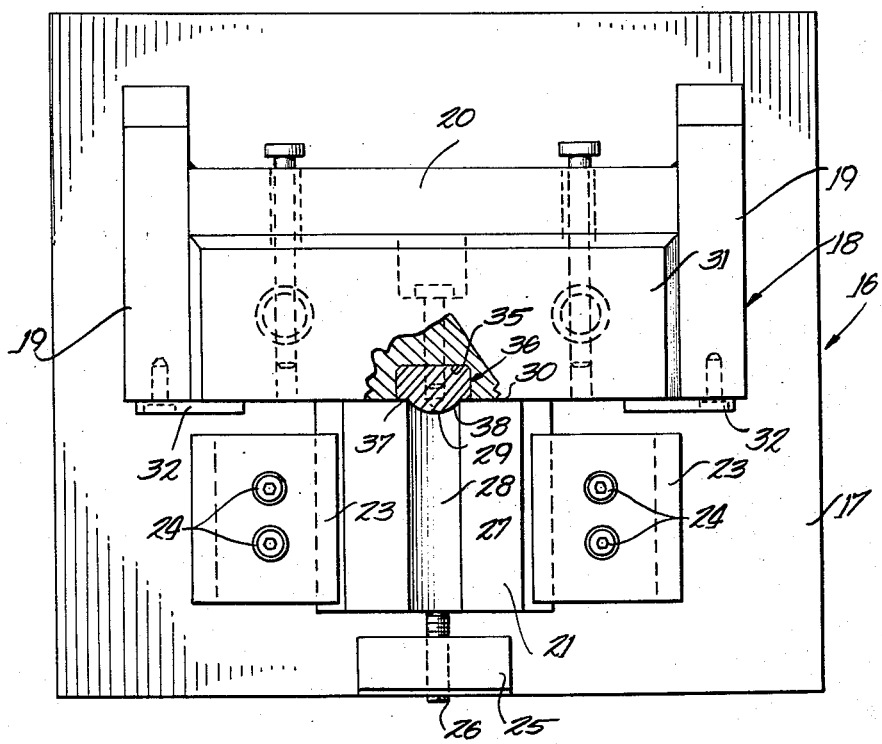
FIGURE 10 is a plan view of an apparatus for forming the ends of a tube.

A T-shaped type of tubular assembly is generally designated by the reference character 10. In the assembly 10, the first tube having a sheared end is designated at 11 and is connected to a second tube by means of brazing or welding indicated at 13. The sheared end of the tube 11 is generally designated by 14 and said tube end is provided with relatively sharp edges 15 as particularly shown in FIGURE 3.

Figure 11:
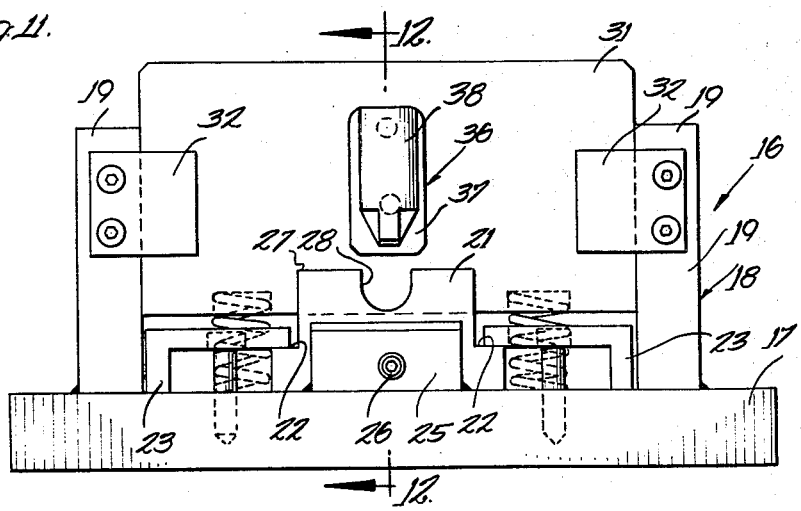
FIGURE 11 is a front elevational view of the apparatus shown in FIGURE 10.

Referring particularly to FIGURES 10, 11 and 12 a tube forming apparatus is generally designated by the reference character 16. The apparatus 16 comprises a base 17 adapted to be positioned on the platen of a punch press or similar press unit (not shown). The base 17 supports a housing 18 consisting of upright sides 19 and a back plate 20, the said sides 19 and 20 being suitably secured to the base 17.

A female die is generally indicated at 21, the said die having laterally positioned shoulders 22 which are engaged by tie down brackets 23 of L-shaped configuration which secure the female die 21 to the base 17 by means of screws 24. A pressure block 25 is rigidly secured to the base 17 and a set screw 26 is tightened to securely support the die 21 on the base 17. The die 21 is provided with a surface 27 having a generally horizontally extending groove 28. A front face 30 on the die 21 is provided with an arcuate recess 29 which connects with the groove 28.

A male die punch holder is generally designated at 31 and the same is positioned in the housing 18 by means of retaining plate 32. The male die 31 is adapted to reciprocate within a space 33 formed by the sides 19 and back plate 20. The base 17 is also provided with a slug clearance opening 34. The front face of the female die 31 is provided with a recess 35 having a punch generally designated at 36 secured therein. The punch 36, as best shown in FIGURE 7, has a front face 37 and is provided with a vertically extending projecting member 38 of arcuate shape and having at its lower end a pair of arcuate cutting edges designated at 39. The shape of the projecting member 38 and cutting edges 39 is such that it conforms generally to the arcuate recess or cutting edge 29.

The punch 36 as indicated also is further provided with a slot forming punch portion generally designated at 40. The slot forming punch portion 40 is positioned below the cutting edges 39 and is of relatively narrow shape. The front portion of the slot forming punch portion 40 is provided with an arcuate surface 41 of the same contour as the arcuate projecting member 38. The slot forming punch portion 40 further includes parallel side walls 42 which extend rearwardly toward the face 37 to a point where they meet a pair of shoulders 43 each of which is disposed on opposite sides of the punch portion 40. The shoulders 43 project outwardly from the face 37 and slope in a diverging manner upwardly from the lower end of the punch portion 40 so as to provide a pair of diverging cutting edges designated at 44.

The lower end of the slot forming punch 40 is provided with a stepped cutting edge of generally U-shaped configuration with the first step of said cutting edge being indicated by the reference character 45. Disposed slightly above the first step cutting edge 45 is a cutting edge 46 as best shown in FIGURES 6 and 9. The punch 36 is provided with a pair of tapped holes 47 as best shown in FIGURE 21 and is retained in the recess 35 by means of screws 48 which are recessed in bores 49 of the punch holder 31.

Referring now to FIGURE 4 the tube 11 is initially formed at its upper outer end with a slot or recess 53 of generally U-shaped configuration and being open at its end. The U-shaped slot 53 meets a pair of recesses or slots 54 each of which is disposed on opposite sides of the slot 53 in a generally T-shaped configuration.

The letters A and B designate the slugs which are sheared from the end of the tube and the letters C and D designate the slugs sheared from the ends of the tube which complete the forming operation as shown in FIGURES 7 and 8.

In the operation the tube 11 is placed in the position shown in FIGURE 12 wherein the end of the tube engages the front face of the punch holder 31. One end of the tube 11 therefore is now disposed over the cutting edge 29 formed by the arcuate recess which is disposed at the end of the groove 28. The punch holder 31 is now pressed downwardly by a suitable punch press or other actuator whereupon the first step cutting edge 45 starts to shear a portion of the top outer wall of the tube end and whereby during continued movement the second step 46 completes the U-shaped slot 53 shown in FIGURE 4. While this movement and slot forming operation is being performed the diverging cutting edges 44 also are forming the slots 54, as shown in FIGURE 4. Continued movement of the punch holder 31 in the same direction now causes the stepped cutting edges 45 and 46 to shear the lower inner wall portion of the tube end whereby this lower end is similarly formed with the T-shaped slot configuration shown in FIGURE 4. During the movement of the punch holder 31 the cutting edges 39 have now started cutting the upper wall portion of the end of the tube and as the cutting edges 39 now move through for engagement with the cutting edge 29 the lower wall portion of the tube is sheared and the notched end 14 as shown in FIGURE 5 is formed. The male die or punch holder 31 now is returned to its original position by means of the spring 50 and the operation can be repeated on the next tube to be formed.

FIGURES 7 and 8 show the disposition of the slugs during the shearing operation. Slug A is a slug which is moved downwardly after the first slot is formed at the top of the tube and as it is moved downwardly it is forced through the lower end of the tube which with the punch cutting edges 45 and 46 now notches the lower wall of the tube to shape the slug B. Simultaneously slugs C and D are being formed as the cutting edges 39 cut through the upper and lower side wall portions of the tube. The slugs which are formed during the formation of the slots 54 are not shown but these lugs with the slugs A, B, C and D are ejected through the slug clearance opening 34. The tube end has now been prepared and thus it can be seen with one single stroke of the press the complete operation is completed.

The punch having the successive stages of operation successfully form the end of a tube during a single stroke of the press which is not possible with the punch and dies heretofore developed. In assemblies of the type wherein brazing and fined soldering or welding techniques are employed it is necessary to provide an effectively sharp and snug fit which is accomplished by the present apparatus and method described.

Thus it is believed that the objects of the invention have been fully achieved and that changes and modifications may be made without departing from the spirit of the invention as disclosed or from the scope thereof as defined in the appended claims.

What is claimed is:

1. Apparatus for shearing one end of a tubular member to shape the end thereof to fit against the side wall of another tubular member in a snug manner throughout the entire periphery of the contacting surfaces of the said two members comprising:
   (a) a female die having an upper surface including a first groove complementary to the tubular member to be sheared and for supporting the same,
   (b) a second punch engaging surface on said die including a generally vertical groove joining said first groove to provide an arcuately shaped first cutting edge,
   (c) a male die positioned to move relative to said female die,
   (d) a punch supported on said male die for movement therewith,
   (e) said punch having a face engaging said punch engaging surface and being relatively movable with respect thereto,
   (f) an arcuate member projecting from said punch face and engaging said second groove in mating and in relative sliding relation,
   (g) said arcuate member having a lower end portion including a substantially centrally disposed narrow slot forming punch portion,
   (h) said lower end portion including a pair of cutting edges disposed on opposite sides of said slot forming punch portion and being adapted to complement and cooperate in shearing relation with said first cutting edge,
   (i) said slot forming punch element having an arcuate front face and substantially parallel vertical side walls terminating in a pair of shoulders projecting outwardly from said punch face and being positioned on opposite sides of said slot forming punch element and below said pair of cutting edges,
   (j) a lower two-step U-shaped cutting edge on said slot forming punch element,
   (k) said shoulders having opposed sides diverging upwardly from said two-step cutting edge,
   (l) whereby during movement of said punch said slot forming punch element initially punches out a U-shaped slot in an upper wall portion of a tubular member and said cutting edges then cooperate to shape the end of said tube.

2. Apparatus for shearing one end of a tubular member to shape the end thereof to fit against the side wall of another tubular member in a snug manner throughout the entire periphery of the contacting surfaces of the said two members comprising:
   (a) a female die having an upper surface including a first groove complementary to the tubular member to be sheared and for supporting the same,
   (b) a second punch engaging surface on said die including a generally vertical groove joining said first groove to provide an arcuately shaped first cutting edge,
   (c) a male die positioned to move relative to said female die,
   (d) a punch supported on said male die for movement therewith,
   (e) said punch having a face engaging said punch engaging surface and being relatively movable with respect thereto,
   (f) an arcuate member projecting from said punch face and engaging said second groove in sliding relation,
   (g) said arcuate member having a lower end portion including narrow slot forming punch portion, (h) said lower end portion including a pair of cutting edges disposed on opposite sides of said slot forming punch portion and being adapted to complement and cooperate in shearing relation with said first cutting edge, (i) said slot forming punch portion having a vertical height at least one-half the outer diameter of the tubular member to be sheared, (j) said slot forming punch element having an arcuate front face and substantially parallel vertical side walls terminating in a pair of shoulders projecting outwardly from said punch face and being positioned on opposite sides of said slot forming punch element and below said pair of cutting edges, (k) a lower two-step U-shaped cutting edge on said slot forming punch element, (l) said shoulders having opposed sides diverging upwardly from said two-step cutting edge, (m) whereby during movement of said punch said slot forming punch element initially punches out a U-shaped slot in an upper wall portion of a tubular member and said cutting edges then cooperate to shape the end of said tube.

3. Apparatus for shearing one end of a tubular member to shape the end thereof to fit against the side wall of another tubular member in a snug manner throughout the entire periphery of the contacting surfaces of the said two members comprising:

(a) a female die having an upper surface including a first groove complementary to the tubular member to be sheared and for supporting the same, (b) a second punch engaging surface on said die including a generally vertical groove joining said first groove to provide an arcuately shaped first cutting edge, (c) a male die positioned to move relative to said female die, (d) a punch supported on said male die for movement therewith, (e) said punch having a face engaging said punch engaging surface and being relatively movable with respect thereto, (f) an arcuate member projecting from said punch face and engaging said second groove in mating and in relative sliding relation, (g) said arcuate member having a lower end portion including a narrow slot forming punch portion, (h) said lower end portion including a pair of cutting edges disposed on opposite sides of said slot forming punch portion and being adapted to complement and cooperate in shearing relation with said first cutting edge, (i) said slot forming punch element having an arcuate front face and substantially parallel vertical side walls terminating in a pair of shoulders projecting outwardly from said punch face intermediate said punch face and said front face being positioned on opposite sides of said slot forming punch element and below said pair of cutting edges, (j) a lower U-shaped cutting edge on said slot forming punch element, (k) said shoulders having opposed sides diverging upwardly from said U-shaped cutting edge, (l) whereby during movement of said punch said slot forming punch element initially punches out a U-shaped slot in an upper wall portion of a tubular member and said cutting edges then cooperate to shape the end of said tube.

4. Apparatus for shearing one end of a tubular member to shape the end thereof to fit against the side wall of another tubular member in a snug manner throughout the entire periphery of the contacting surfaces of the said two members comprising:

(a) a female die having an upper surface including a first groove complementary to the tubular member to be sheared and for supporting the same, (b) a second punch engaging surface on said die including a generally vertical groove joining said first groove to provide an arcuately shaped first cutting edge, (c) a male die positioned to move relative to said female die, (d) a punch supported on said male die for movement therewith, (e) said punch having a face engaging said punch engaging surface and being relatively movable with respect thereto, (f) an arcuate member projecting from said punch face and engaging said second groove in mating and in relative sliding relation, (g) said arcuate member having a lower end portion including a substantially centrally disposed narrow slot forming punch portion, (h) said lower end portion including a pair of cutting edges disposed on opposite sides of said slot forming punch portion and being adapted to complement and cooperate in shearing relation with said first cutting edge, (i) said slot forming punch element having a front face and vertical side walls terminating in a pair of shoulders projecting outwardly from said punch face and being positioned on opposite sides of said slot forming punch element and below said pair of cutting edges, (j) a lower cutting edge on said slot forming punch element, (k) said shoulders having opposed sides diverging upwardly from said lower cutting edge, (l) whereby during movement of said punch said slot forming punch element initially punches out a slot in an upper wall portion of a tubular member and said cutting edges then cooperate to shape the end of said tube.

References Cited by the Examiner
UNITED STATES PATENTS

| | | | |
|---|---|---|---|
| 3,180 | 7/43 | Wallace | 83—54 |
| 9,262 | 9/52 | Richards | 83—54 |
| 2,064,539 | 12/36 | Hart | 83—54 X |
| 2,064,796 | 12/36 | Gray | 83—693 X |
| 2,065,761 | 12/36 | Smith | 83—581 |
| 3,077,808 | 2/63 | Post | 83—581 |

ANDREW R. JUHASZ, *Primary Examiner.*

LEON PEAR, *Examiner.*